United States Patent
Komine et al.

(10) Patent No.: US 8,565,147 B2
(45) Date of Patent: Oct. 22, 2013

(54) FREQUENCY BLOCK ALLOCATION APPARATUS AND METHOD, AND COMPUTER PROGRAM

(75) Inventors: Toshihiko Komine, Fujimino (JP); Takeo Ohseki, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 315 days.

(21) Appl. No.: 12/873,621

(22) Filed: Sep. 1, 2010

(65) Prior Publication Data

US 2011/0058543 A1 Mar. 10, 2011

(30) Foreign Application Priority Data

Sep. 7, 2009 (JP) ................................ 2009-205885

(51) Int. Cl.
*H04B 7/208* (2006.01)
(52) U.S. Cl.
USPC ........... 370/320; 370/321; 370/326; 370/330; 370/334; 370/335; 370/337; 370/339; 370/341; 370/344; 370/347; 370/350
(58) Field of Classification Search
USPC .......... 455/450–452.2, 435, 447, 23, 42, 512, 455/62, 71, 150.1, 154, 158, 166; 370/344, 370/449, 320, 321, 326, 329, 330, 334, 335, 370/336, 337, 339, 341, 347, 350; 718/104
See application file for complete search history.

(56) References Cited

U.S. PATENT DOCUMENTS

| | | | | |
|---|---|---|---|---|
| 6,333,936 B1 * | 12/2001 | Johansson et al. | ............ | 370/449 |
| 2007/0293233 A1 * | 12/2007 | Inoue et al. | ................... | 455/450 |
| 2008/0123762 A1 * | 5/2008 | Mizusawa | ..................... | 375/260 |
| 2008/0261608 A1 * | 10/2008 | Mochizuki | ..................... | 455/450 |
| 2011/0113433 A1 * | 5/2011 | Koyanagi et al. | ............ | 718/104 |

FOREIGN PATENT DOCUMENTS

| | | |
|---|---|---|
| JP | 2008-271321 | 11/2008 |
| JP | 2008271321 A * | 11/2008 |
| WO | 2007007380 A1 | 1/2007 |

OTHER PUBLICATIONS

"Formulation of Optimum Radio Resource Allocation for Uplink in Evolved-UTRA System," Satoshi Konishi, et al., Proceedings of the Communications Society of the IEICE General Conference 2009, The Institute of Electronics, Information and Communication Engineers, Sep. 1, 2009, B-5-19, p. 368.
JP Office Action issued Feb. 5, 2013.

\* cited by examiner

*Primary Examiner* — Jeffrey M Rutkowski
*Assistant Examiner* — Hardikkumar Patel
(74) *Attorney, Agent, or Firm* — Morgan, Lewis & Bockius LLP

(57) ABSTRACT

A frequency block allocation apparatus based on a single carrier frequency division multiple access method includes an allocation index computation target selector that selects frequency block groups, each consisting of one or more continuous non-allocated frequency blocks from a set of non-allocated frequency blocks; an allocation index computation unit that computes an allocation index for each target pair of each frequency block group and a terminal; and a frequency block allocation unit that determines one of the target pairs to be a frequency block allocation target, in accordance with priority based on the computed allocation indexes.

8 Claims, 10 Drawing Sheets

FIG. 8
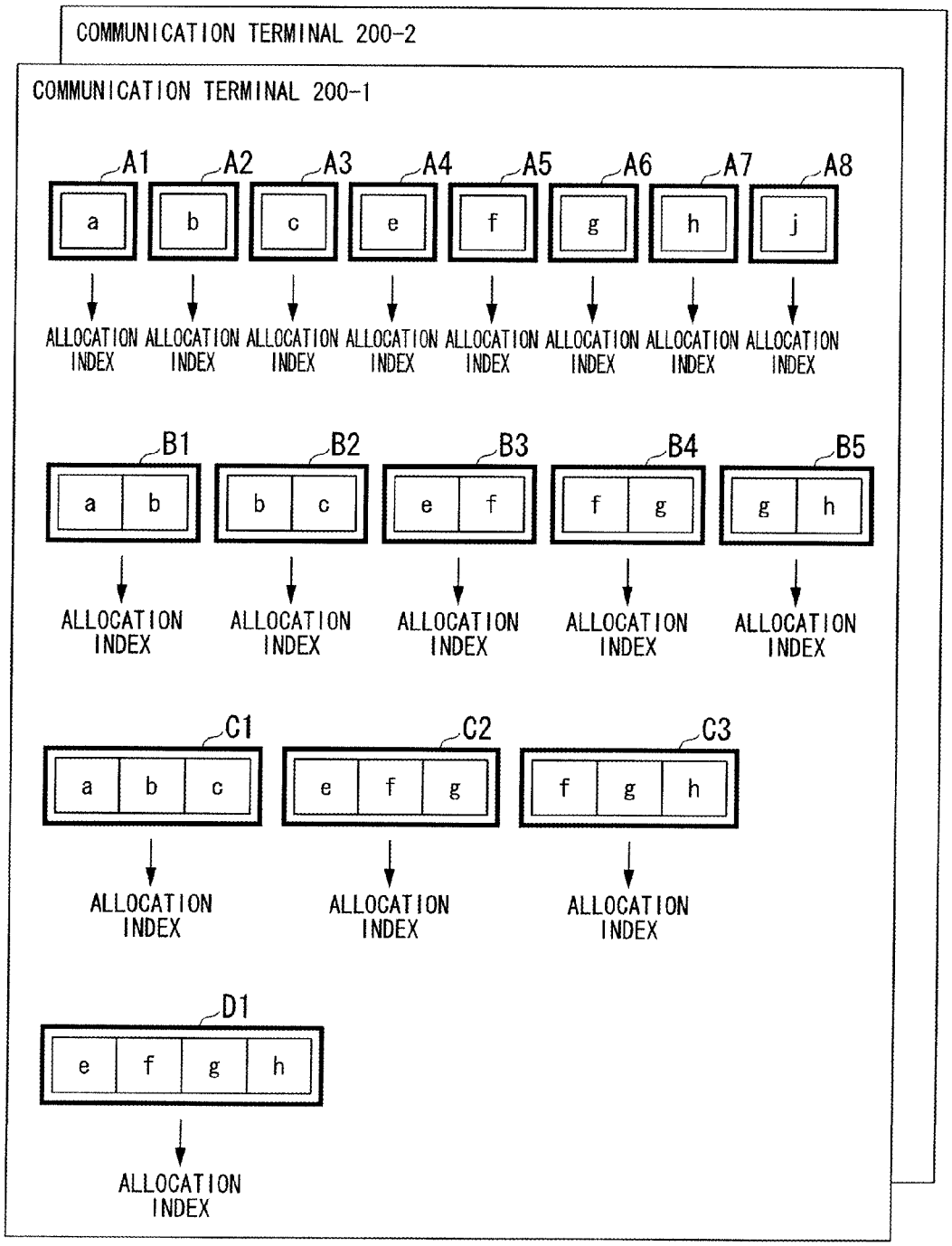
 : NON-ALLOCATED FREQUENCY BLOCK
 : FREQUENCY BLOCK GROUP

FREQUENCY BLOCK ALLOCATION APPARATUS AND METHOD, AND COMPUTER PROGRAM

BACKGROUND OF THE INVENTION

1. Field of the Invention

The present invention relates to a frequency block allocation apparatus, a frequency block allocation method, and a relevant computer program based on a single carrier frequency division multiple access (SC-FDMA) method.

Priority is claimed on Japanese Patent Application No. 2009-205885, filed Sep. 7, 2009, the contents of which are incorporated herein by reference.

2. Description of the Related Art

For frequency block allocation, Patent Document 1 (Japanese Unexamined Patent Application, First Publication No. 2008-271321) discloses a technique in which an orthogonal frequency division multiple access (OFDMA) method is assumed. In the technique, for each frequency block, a terminal having a maximum allocation index is determined Among the determined terminals, one having the maximum allocation index is selected, and the frequency block assigned to the relevant maximum allocation index is allocated to the selected terminal.

However, in the above conventional frequency block allocation technique, the following problem occurs in the SC-FDMA method.

In the SC-FDMA method, sub-carriers arranged continuously or at regular intervals are allocated to communication terminals. Therefore, when allocating frequency blocks to each terminal, the continuous frequency blocks should be continuous. If a known frequency block allocation technique is used, a group of continuous frequency blocks, which include a frequency block having a maximum allocation index, are allocated, where the group of the continuous frequency blocks does not always produce a best channel quality.

For example, as shown in FIG. 12, if a frequency block "a" having a maximum allocation index is allocated to a terminal, a band A having continuous frequency blocks which include the frequency block "a" is allocated to the terminal. However, for the terminal, another band B has better channel quality than band A, where the band B does not include the frequency block "a" but has a frequency block "b" having a lower allocation index than the frequency block a. That is, in contrast to the OFDMA method, in the SC-FDMA method, a band including a frequency block having a maximum allocation index does not produce the best channel quality. Therefore, when applying the known frequency block allocation technique to the SC-FDMA method, the efficiency of the frequency usage may be degraded.

SUMMARY OF THE INVENTION

In light of the above circumstances, an object of the present invention is to provide a frequency block allocation apparatus, a frequency block allocation method, and a relevant computer program, by which a desirable efficiency of the frequency usage can be obtained on the SC-FDMA method.

Therefore, the present invention provides a frequency block allocation apparatus based on a single carrier frequency division multiple access method, the apparatus comprising:

an allocation index computation target selector that selects frequency block groups, each consisting of one or more continuous non-allocated frequency blocks from a set of non-allocated frequency blocks;

an allocation index computation unit that computes an allocation index for each target pair of each frequency block group and a terminal; and a frequency block allocation unit that determines one of the target pairs to be a frequency block allocation target, in accordance with priority based on the computed allocation indexes.

In a typical example, for the terminal, if the computed allocation index assigned to a first frequency block group consisting of N non-allocated frequency blocks satisfies an allocation index computation target criterion, where N is a positive integer, then the allocation index computation target selector selects a second frequency block group which includes the first frequency block group.

In this case, preferably, the allocation index computation target selector compares the computed allocation index assigned to the first frequency block group consisting of the N non-allocated frequency blocks with the computed allocation index assigned to the second frequency block group which includes the first frequency block group and consists N+M non-allocated frequency blocks, where M is a positive integer, and selects a third frequency block group including the second frequency block group only when the computed allocation index of the second frequency block group is equal to or better than that of the first frequency block group.

In this case, preferably, the allocation index computation target selector selects only the third frequency block group consisting of N+M+L non-allocated frequency blocks to be an allocation index computation target for the terminal, where L is a positive integer, and the N+M+L non-allocated frequency blocks are obtained by adding L non-allocated frequency blocks in continuous succession with the M non-allocated frequency blocks added to the first frequency block group.

In another typical example, the allocation index computation target selector selects each non-allocated frequency block, in turn, starting from an end of a system band, to be a base point for the frequency block group selection.

In another typical example, the frequency blocks consist of one or more sub-carriers which are arranged continuously or at regular intervals.

The present invention also provides a frequency block allocation method based on a single carrier frequency division multiple access method, the method comprising:

a step that selects frequency block groups, each consisting of one or more continuous non-allocated frequency blocks from a set of non-allocated frequency blocks;

a step that computes an allocation index for each target pair of each frequency block group and a terminal; and a step that determines one of the target pairs to be a frequency block allocation target, in accordance with priority based on the computed allocation indexes.

The present invention also provides a computer program used for making a computer execute a frequency block allocation operation based on a single carrier frequency division multiple access method, the program comprising:

a step that selects frequency block groups, each consisting of one or more continuous non-allocated frequency blocks from a set of non-allocated frequency blocks;

a step that computes an allocation index for each target pair of each frequency block group and a terminal; and a step that determines one of the target pairs to be a frequency block allocation target, in accordance with priority based on the computed allocation indexes.

In accordance with the present invention, a desirable efficiency of the frequency usage can be obtained on the SC-FDMA method.

BRIEF DESCRIPTION OF THE DRAWINGS

FIG. 8 is a diagram showing an example of the allocation index computation.

DETAILED DESCRIPTION OF THE INVENTION

Hereinafter, an embodiment of the present invention will be described with reference to the appended figures.

Figure 1:
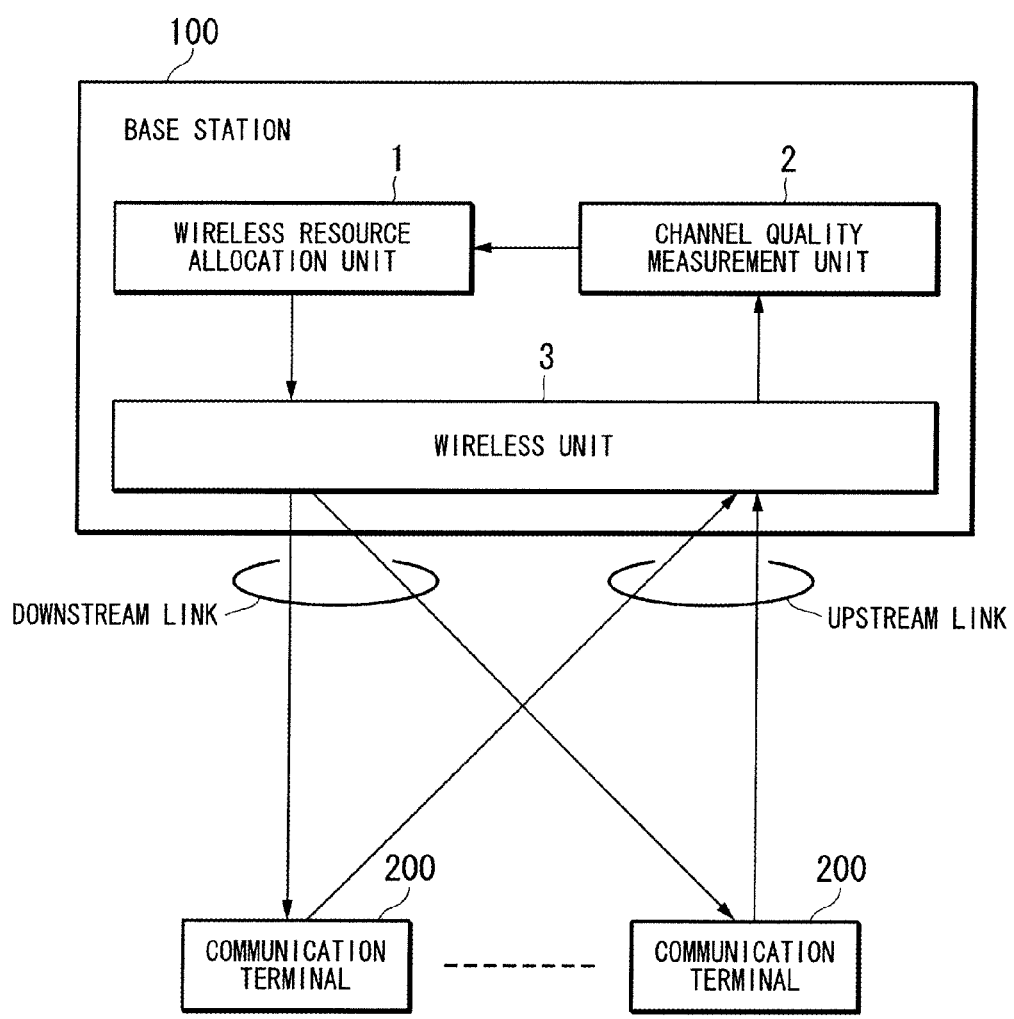
FIG. 1 is a block diagram showing the structure of a wireless communication system relating to an embodiment of the present invention.

FIG. 1 is a block diagram of the structure of a wireless communication system relating to the embodiment of the present invention. The wireless communication system in FIG. 1 is based on the LTE (long term evolution) standard.

In FIG. 1, a base station 100 and communication terminals 200 perform wireless communication. The upstream links (from the terminal toward the base station) are based on the SC-FDMA method. The downstream links (from the base station toward the terminal) are based on the OFDMA method.

Figure 2:
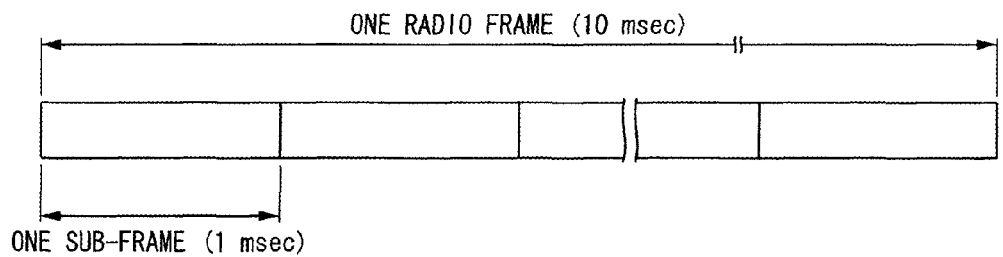
FIG. 2 is a diagram showing the structure of a radio frame on the upstream links based on the SC-FDMA method in the wireless communication system of the embodiment.

FIG. 2 is a diagram showing the structure of a radio frame on the upstream links based on the SC-FDMA method in the wireless communication system of the present embodiment. In FIG. 2, each radio frame (having a length of 10 msec) consists of 10 sub-frames, each of which has a length of 1 msec.

Figure 3:
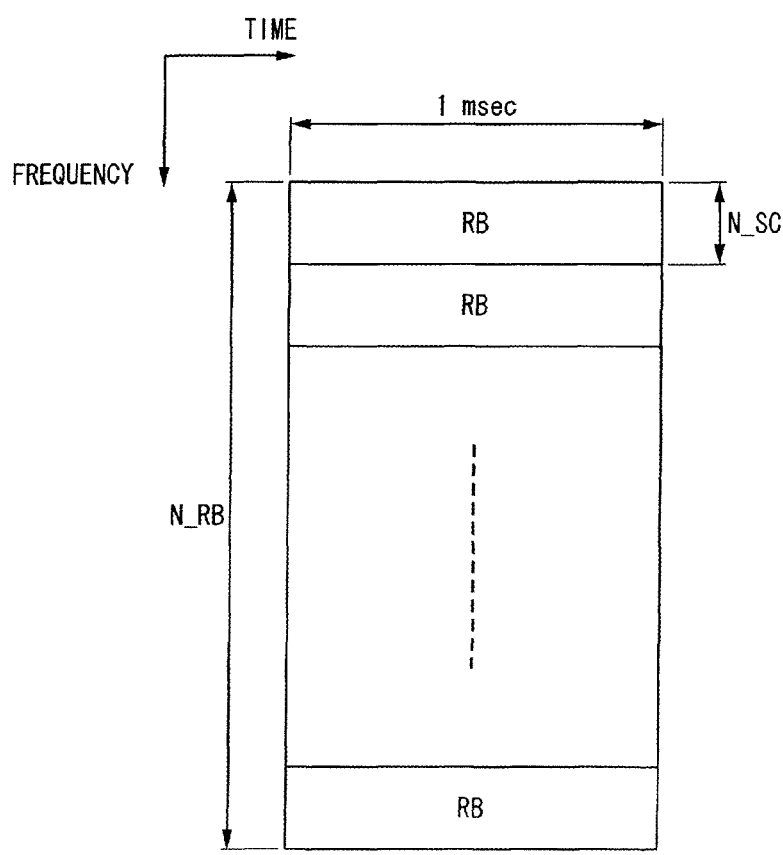
FIG. 3 is a schematic diagram showing a wireless resource arrangement of each sub-frame shown in FIG. 2.

FIG. 3 is a schematic diagram showing a wireless resource arrangement of each sub-frame shown in FIG. 2. As shown in FIG. 3, wireless resources in one sub-frame are arranged in a manner such that a number N_RB of resource blocks (RBs) are coupled with each other in the frequency direction.

Each RB has a predetermined frequency band width (corresponding to a number N_SC of sub-carriers) and a predetermined time width (1 msec). The frequency band width of the "N_RB" RBs corresponds to a frequency band width (called a "system frequency band width") which can be used in the present wireless communication system. The wireless resources are allocated to the communication terminals 200 by RB units.

Returning to FIG. 1, the base station 1001 has a wireless resource allocation unit 1, a channel quality measurement unit 2, and a wireless unit 3.

For each sub-frame, the wireless resource allocation unit 1 performs RB allocation to the terminals 200 for the upstream links.

The channel quality measurement unit 2 measures channel quality for the upstream links.

The wireless unit 3 performs transmission and reception of wireless signals to and from each communication terminal 200.

In the RB allocation for the upstream links based on the SC-FDMA method, when the wireless resource allocation unit 1 allocates a plurality of RBs to one of the communication terminals 200, continuous RBs are allocated. Accordingly, continuous sub-carriers are allocated to the relevant communication terminal 200.

Information of the RBs allocated to the communication terminal 200 is communicated to the communication terminal 200 through the downstream links. The communication terminal 200 performs transmission through the upstream links by using the RBs (for the upstream links) allocated to itself.

The relationships between the RBs and frequency blocks in the first embodiment will be explained below. The frequency blocks function as units for sub-carrier allocation. That is, as the units for the sub-carrier allocation, the RBs correspond to the frequency blocks. Therefore, in each sub-frame shown in FIG. 3, each RB corresponds to a frequency block, and the number of the frequency blocks is N_RB.

Here, each RB has a frequency resource and a time resource, and the RB allocation is performed in each sub-frame (i.e., for each RB time (1 msec)). Therefore, in the present embodiment, the frequency block allocation substantially equals to the RB allocation. In the following explanation, the frequency block functions as a sub-carrier allocation unit, where the frequency block allocation corresponds to the RB allocation.

Figure 4:
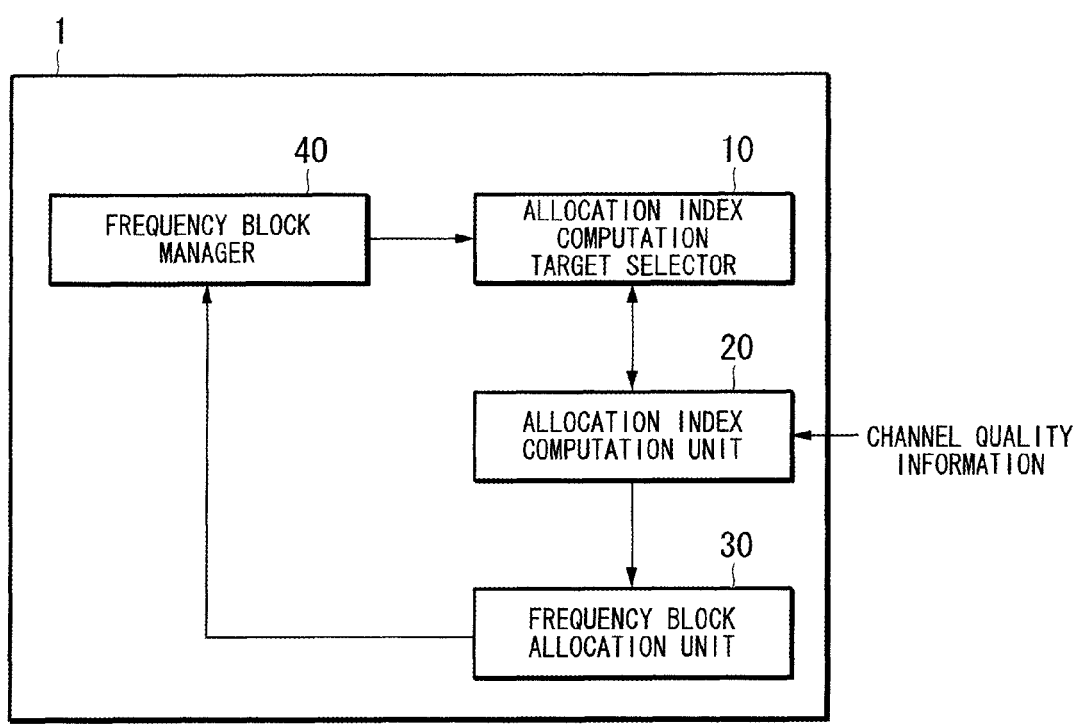
FIG. 4 is a block diagram showing the structure of the wireless resource allocation unit 1 in FIG. 1, which relates to the RB allocation for the upstream links.

FIG. 4 is a block diagram showing the structure of the wireless resource allocation unit 1 (see FIG. 1) relating to the RB allocation for the upstream links. In FIG. 4, the wireless resource allocation unit 1 has an allocation index computation target selector 10, an allocation index computation unit 20, a frequency block allocation unit 30, and a frequency block manager 40.

The frequency block manager 40 manages the frequency block allocation for each sub-frame. More specifically, for each of all frequency blocks (the number of which is RB, and which correspond to the system band width) in each sub-frame, the frequency block manager 40 stores allocation information whether or not the relevant frequency block has been subjected to the allocation.

Each frequency block which has not yet been subjected to the allocation (i.e., non-allocated frequency block) is a frequency block which has not yet been allocated to any communication terminal 200. Each frequency block which has not already been subjected to the allocation (i.e., previously-allocated frequency block) is a frequency block which has been allocated to any communication terminal 200, a frequency block allocated for broadcast, or a frequency block allocated to a control channel.

The allocation index computation target selector 10 selects a group of one or more frequency blocks (i.e., frequency block group) as an allocation index computation target from among a non-allocated frequency block set, which includes all non-allocated frequency blocks in the relevant sub-frame. The allocation index computation target selector 10 obtains non-allocated frequency block set information from the frequency block manager 40. The non-allocated frequency block set information has indexes of all non-allocated frequency blocks included in the non-allocated frequency block set.

To the frequency blocks, ascending indexes are applied along the frequency direction. For convenience of explanation of the present embodiment, the ascending indexes are "a, b, c, . . . " (in alphabetical order).

The allocation index computation target selector 10 can detect all non-allocated frequency blocks included in the non-allocated frequency block set. The allocation index computation target selector 10 can also detect (i) a continuity of the non-allocated frequency blocks by referring to a continuity of the indexes in the non-allocated frequency block set information, and (ii) a discontinuity in the non-allocated frequency blocks by referring to a discontinuity (or omission) in the indexes in the non-allocated frequency block set information.

That is, the allocation index computation target selector 10 can detect (i) any continuity between a non-allocated frequency block and another non-allocated frequency block by detecting each continuity of the non-allocated frequency blocks in the non-allocated frequency block set information, and (ii) any discontinuity between a non-allocated frequency block and another non-allocated frequency block by detecting each discontinuity in the non-allocated frequency blocks of the non-allocated frequency block set information.

The frequency block set as the frequency block group consists of one or more continuous non-allocated frequency blocks. Based on the non-allocated frequency block set information, the allocation index computation target selector 10 selects one or more continuous non-allocated frequency blocks as the frequency block group. The allocation index computation target selector 10 informs the allocation index computation unit 20 of the indexes of all (i.e., one or more) non-allocated frequency blocks which form the frequency block group.

The allocation index computation unit 20 computes allocation indexes based on channel quality information for a set of the targets for the allocation index computation. For example, when computing an allocation index assigned to a set of the frequency block group A and a communication terminal 200-1 (as the targets), the allocation index computation unit 20 computes the relevant allocation index based on channel quality information about the frequency block group A of the communication terminal 200-1.

The allocation index computation unit 20 obtains such channel quality information from the channel quality measurement unit 2. The channel quality information may be information (e.g., SNR (signal to interference and noise power ratio) or RSSI (received signal strength indicator)) which represents transmission quality of upstream links. Additionally, as the allocation index computation method, a proportional fairness method may be used.

The allocation index computation unit 20 informs the frequency block allocation unit 30 of each allocation index and information about the relevant pair of the computation targets (i.e., the indexes of all non-allocated frequency blocks which form the relevant frequency block group and an identifier of the relevant communication terminal 200).

The frequency block allocation unit 30 selects a pair included in the allocation index computation target pair set to be a frequency block allocation target in accordance with the priority based on the allocation indexes. In the selection of each pair, duplication of the non-allocated frequency block or the communication terminal 200 is prevented.

The frequency block allocation unit 30 allocates the frequency block group in the frequency block allocation target set to the communication terminal 200 in the relevant set. The frequency block allocation unit 30 then informs the frequency block manager 40 of the indexes of all non-allocated frequency blocks included in the allocates frequency block group. Accordingly, the frequency block manager 40 revises the allocation information for the frequency blocks having the indexes communicated from the frequency block allocation unit 30, from "non-allocated" to "previously allocated".

Next, the frequency block allocation process performed by the wireless resource allocation unit 1 (see FIG. 4) of the present embodiment will be explained using practical examples.

Example 1

Figure 5:
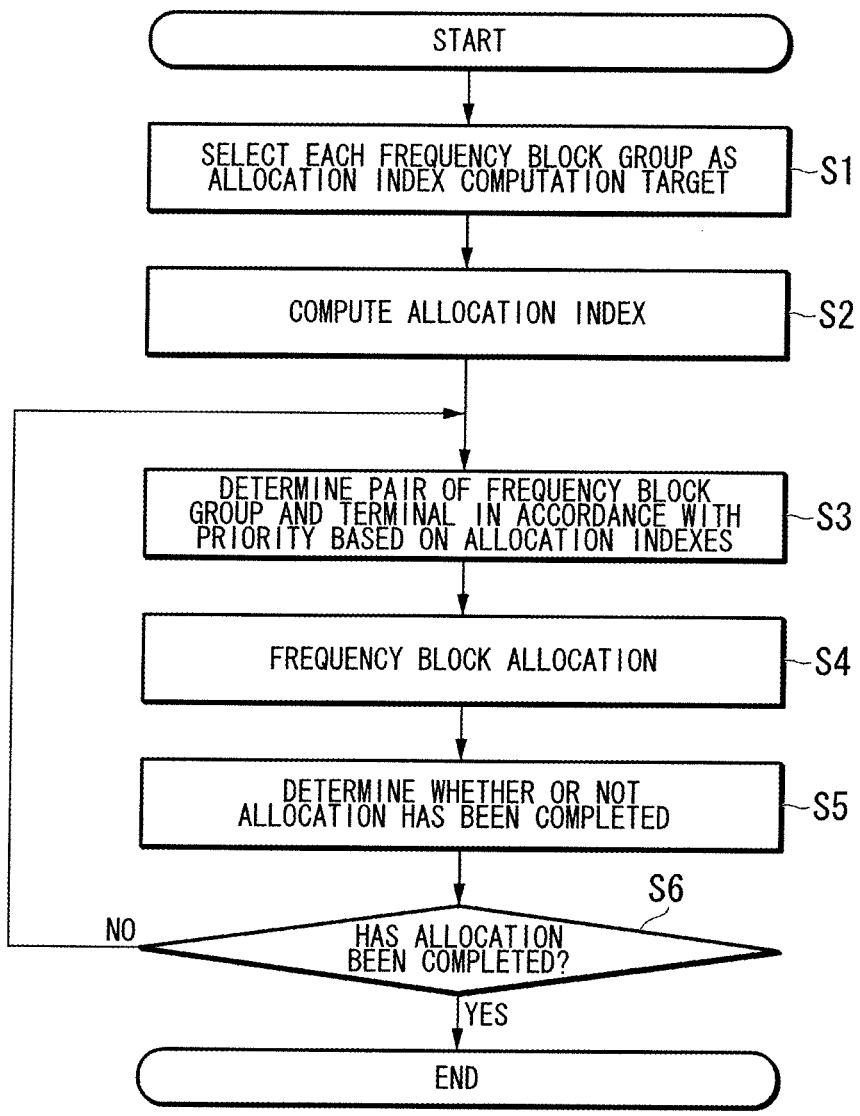
FIG. 5 is a flowchart showing a frequency block allocation method for Example 1 of the present invention.

FIG. 5 is a flowchart showing a frequency block allocation method for Example 1 of the present invention. Below, with reference to FIG. 5, operation in Example 1 by the wireless resource allocation unit 1 will be explained by appropriately showing practical examples thereof.

The wireless resource allocation unit 1 starts the operation of FIG. 5 when the timing of the frequency block allocation of a sub-frame starts.

In step S1, the allocation index computation target selector 10 obtains the non-allocated frequency block set information from the frequency block manager 40. Based on the obtained non-allocated frequency block set information, the allocation index computation target selector 10 selects each frequency block group from the non-allocated frequency block set. For each frequency block group, the allocation index computation target selector 10 informs the allocation index computation unit 20 of the indexes of all non-allocated frequency blocks which form the relevant frequency block group.

Figure 7:
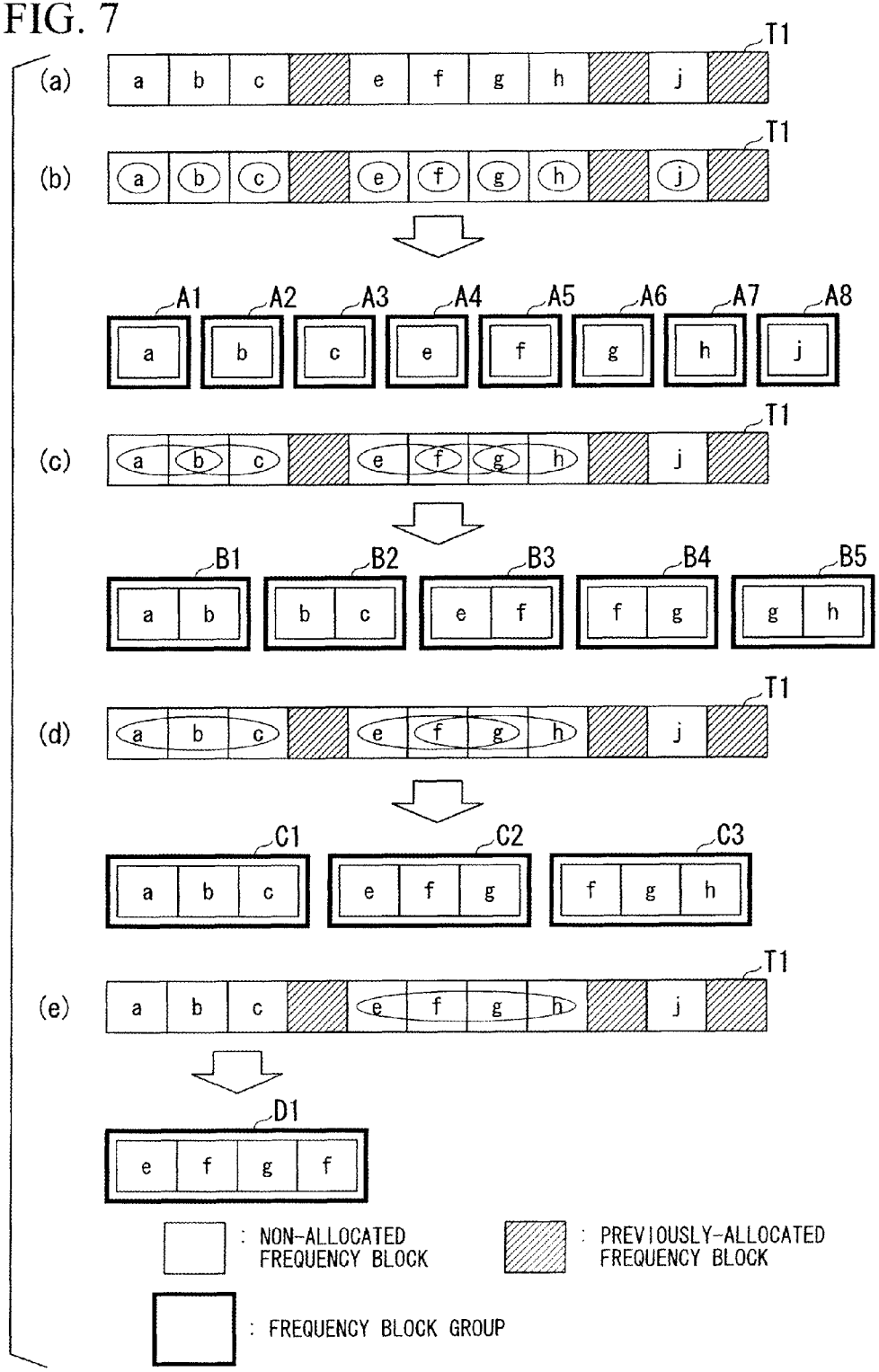
FIG. 7 is a diagram showing examples of the frequency block group selection.

Referring to FIG. 7, the specific method of selecting each frequency block group will be explained. That is, FIG. 7 shows examples of the frequency block group selection. In the examples of FIG. 7, each sub-frame has 11 frequency blocks, for convenience of the explanation.

Each frequency block is selected from a non-allocated frequency block set T1 (see part (a) of FIG. 7) which consists of 8 non-allocated frequency blocks a, b, c, e, f, g, h, and j. The non-allocated frequency blocks a, b, and c are continuous. The non-allocated frequency blocks c and e are discontinuous. The non-allocated frequency blocks e, f, g, and h are continuous. The non-allocated frequency blocks h and j are discontinuous. In addition, frequency blocks d, i, and k are previously-allocated frequency blocks, and have been already secured for retransmission or the like.

In a selection example of part (b) in FIG. 7, based on the information "a, b, c, e, f, g, h, and j" of the non-allocated frequency block set T1, the allocation index computation target selector 10 selects all non-allocated frequency blocks a, b, c, e, f, g, h, and j as frequency block groups A1, A2, A3, A4, A5, A6, A7, and A8, respectively. Therefore, the frequency block groups A1, A2, A3, A4, A5, A6, A7, and A8 each consist of one non-allocated frequency block.

In a selection example of part (c), based on the information "a, b, c, e, f, g, h, and j" of the non-allocated frequency block set T1, the allocation index computation target selector 10 selects frequency block sets a and b, b and c, e and f, f and g, and g and h (each of which consists of two continuous non-allocated frequency blocks) as frequency block groups B1, B2, B3, B4, and B5, respectively. Therefore, the frequency block groups B1, B2, B3, B4, and B5 each consist of two non-allocated frequency blocks.

In a selection example of part (d), based on the information "a, b, c, e, f, g, h, and j" of the non-allocated frequency block set T1, the allocation index computation target selector 10 selects frequency block sets "a, b, and c", "e, f and g", and "f, g, and h" (each of which consists of three continuous non-allocated frequency blocks) as frequency block groups C1, C2, and C3, respectively. Therefore, the frequency block groups C1, C2, and C3 each consist of three non-allocated frequency blocks.

In a selection example of part (e), based on the information "a, b, c, e, f, g, h, and j" of the non-allocated frequency block set T1, the allocation index computation target selector 10 selects a frequency block set "e, f, g, and h", which consists of four continuous non-allocated frequency blocks, as a frequency block group D1.

In the examples of FIG. 7, four frequency block group selection patters (see parts (b) to (e)) are shown, which have different numbers of continuous non-allocated frequency blocks. For each communication terminal 200, if it is unknown which selection pattern provides best channel quality, then it is desirable to select the frequency block groups at all selection patterns, that, is, select all frequency block groups which can be selected. In contrast, for each communication terminal 200, if a selection pattern which can provide best channel quality can be specified, or a limited selection pattern is obtained based on a specific condition, the frequency block groups may be selected based only on the relevant selection pattern.

If the frequency block groups are not common between all communication terminals 200, then for each frequency block group, the allocation index computation target selector 10 informs the allocation index computation unit 20 of the indexes of all non-allocated frequency blocks which form the relevant frequency block group, and the identifier of the communication terminal 200 as the allocation index computation target.

If the number of the frequency blocks included in each frequency block group is restricted, the allocation index computation target selector 10 selects each frequency block group based on the relevant restriction. For example, if the restriction is that "the number of the frequency blocks in each frequency block group is $2^n \times 3^m \times 5^l$, where n, m, and l are integers greater than or equal to 0", then targets of the selection by the allocation index computation target selector 10 are only frequency block groups, whose numbers of frequency blocks satisfy the above restriction. In the above example, "the number of the frequency blocks=7" does not satisfy the restriction, and the allocation index computation target selector 10 does not select any frequency block group whose number of the frequency blocks is 7.

Returning to FIG. 5, in the next step S2, the allocation index computation unit 20 computes an allocation index assigned to a pair of each frequency block group and the corresponding communication terminal 200. In order to arrange each pair as the allocation index computation target, for the frequency block groups together with the identifier of the communication terminal 200 has been communicated, the allocation index computation unit 20 arranges each pair which includes only the communication terminal 200 having that identifier. In contrast, for the frequency block groups together with no identifier of the communication terminal 200 has been communicated, the allocation index computation unit 20 performs the pair arrangement using all communication terminals 200 as candidates. In addition, the allocation index computation unit 20 detects the frequency blocks which form the target pair by referring the indexes of the frequency block group communicated from the allocation index computation target selector 10.

FIG. 8 shows an example of the allocation index computation. In the example, the frequency block groups have been selected by using all selection patterns (see parts (b) to (e)) in FIG. 7, that is, all possible frequency block groups have been selected.

In FIG. 8, the allocation index computation unit 20 produces each pair between the communication terminal 200-1 and each of all frequency block groups A1 to A8, B1 to B5, C1 to C3, and D1, thereby generating 17 pairs. The allocation index computation unit 20 computes an allocation index for each of the pairs, so that 17 allocation indexes are respectively computed and assigned to the 17 pairs for the communication terminal 200-1. For each other communication terminal 200, the allocation index computation unit 20 computes an allocation index for each pair together with a frequency block group, similarly.

The allocation index computation unit 20 informs the frequency block allocation unit 30 of each computed allocation index and information about the pair of the relevant allocation index computation target (i.e., the indexes of all non-allocated frequency blocks which form the relevant frequency block group and the identifier of the relevant communication terminal 200).

In the next step S3, from the set of the pairs as the allocation index computation targets, the frequency block allocation unit 30 determines each pair to be a frequency block allocation target in accordance with the priority based on the allocation indexes. The set of the pairs as the allocation index computation targets consists of all pairs as the allocation index computation targets for the relevant sub-frame as the frequency block allocation target.

That is, from all pairs (as the allocation index computation targets) to which the allocation indexes have been computed for the sub-frame as the frequency block allocation target, the frequency block allocation unit 30 selects each pair to be a frequency block allocation target in accordance with the priority based on the allocation indexes.

In this process, between the pairs as the frequency block allocation targets, duplication of the non-allocated frequency block and duplication of the communication terminal 200 are prevented. For example, every time the frequency block allocation unit 30 has selected a target pair for the frequency block allocation, the frequency block allocation unit 30 deletes, from the set of the pairs of the allocation index computation targets, each pair which includes (i) any non-allocated frequency block relating to the selected pair, or (ii) the communication terminal 200 of the selected pair. Accordingly, it is possible to prevent duplication about the non-allocated frequency block and the communication terminal 200 between the pairs of the frequency block allocation targets.

Below, practical examples of the method of selecting the frequency block allocation target pair in step S3 will be shown.

Practical Example 1

The frequency block allocation unit 30 stores all information about the allocation indexes and the target pairs for the allocation index computation, communicated from the allocation index computation unit 20. The frequency block allocation unit 30 then searches for an allocation index having the maximum priority in the stored data, and selects the computation target pair to which the allocation index as a search result has been assigned. The frequency block allocation unit 30 then deletes the stored data of each pair, whose frequency block group includes any of all non-allocated frequency blocks which form the frequency block group of the selected pair. The frequency block allocation unit 30 also deletes the stored data of each pair, whose communication terminal 200 coincides with the communication terminal 200 of the selected pair. Accordingly, it is possible to prevent duplication about the non-allocated frequency block and the communication terminal 200 between the pairs of the frequency block allocation targets.

Practical Example 2

The frequency block allocation unit 30 stores the information about the allocation indexes and the target pairs for the allocation index computation, by sorting the information in accordance with the priority based on the allocation indexes. The frequency block allocation unit 30 then selects the computation target pair having the allocation index at the top in the ranking of the sorted and stored data. Similar to the practical example 1, the frequency block allocation unit 30 then deletes the stored data of each pair, (i) whose frequency block group includes any of all non-allocated frequency blocks which form the frequency block group of the selected pair, or (ii) whose communication terminal 200 coincides with the communication terminal 200 of the selected pair.

In the above practical examples 1 and 2, the stored information about the allocation indexes and the target pairs for the allocation index computation corresponds to the set of the allocation index computation target pairs.

In the next step S4, the frequency block allocation unit 30 allocates the frequency block group of the frequency block allocation target pair to the communication terminal 200 of the pair. The frequency block allocation unit 30 then informs the frequency block manager 40 of the indexes of all non-allocated frequency blocks (which are now "previously-allocated frequency blocks") included in the frequency block group allocated to the relevant communication terminal 200.

The frequency block manager 40 updates the allocation information about the frequency blocks having the indexes communicated from the frequency block allocation unit 30, from "non-allocated" to "previously-allocated".

In the next step S5, the frequency block allocation unit 30 determines whether or not the frequency block allocation has been completed. Any conditions for determining that the allocation has been completed can be employed, where at least a condition that there is no non-allocated frequency block or there is no non-allocated communication terminal 200 should be employed. Therefore, if there is no non-allocated frequency block, or if there is no non-allocated communication terminal 200, then it is determined that the frequency block allocation has been completed can be employed.

For example, every time the frequency block allocation unit 30 selects the frequency block allocation target pair, and deletes each pair, (i) whose frequency block group includes any of all non-allocated frequency blocks which form the frequency block group of the selected pair, or (ii) whose communication terminal 200 coincides with the communication terminal 200 of the selected pair, the frequency block allocation unit 30 determines whether or not the set of the allocation index computation target pairs is empty. The fact that the set of the allocation index computation target pairs is empty indicates that there is no non-allocated frequency block, or if there is no non-allocated communication terminal 200.

If it is determined in step S5 that the allocation has been completed (see "YES" in step S6), the operation of FIG. 5 is terminated. If it is determined that the allocation has not yet been completed (see "NO" in step S6), the operation returns to step S3.

In accordance with Example 1, for the upstream links of the SC-FDMA method in a wireless communication system based on the LTE standard, it is determined whether or not each pair (as a unit for determination) of the frequency block group (consisting of one or more non-allocated frequency blocks) and the communication terminal is selected to be a frequency block allocation target, in accordance with the priority based on the relevant allocation indexes. Accordingly, it is possible to have a desired efficiency of the frequency usage in the upstream links of the SC-FDMA method. For example, whether or not each of all possible pairs between the frequency block groups and the communication terminals, which can be used in a sub-frame, is selected as the frequency block allocation target, is determined in accordance with the priority based on the relevant allocation indexes, so as to obtain a maximum efficiency of the frequency usage in the upstream links of the SC-FDMA method.

Example 2

Figure 9:
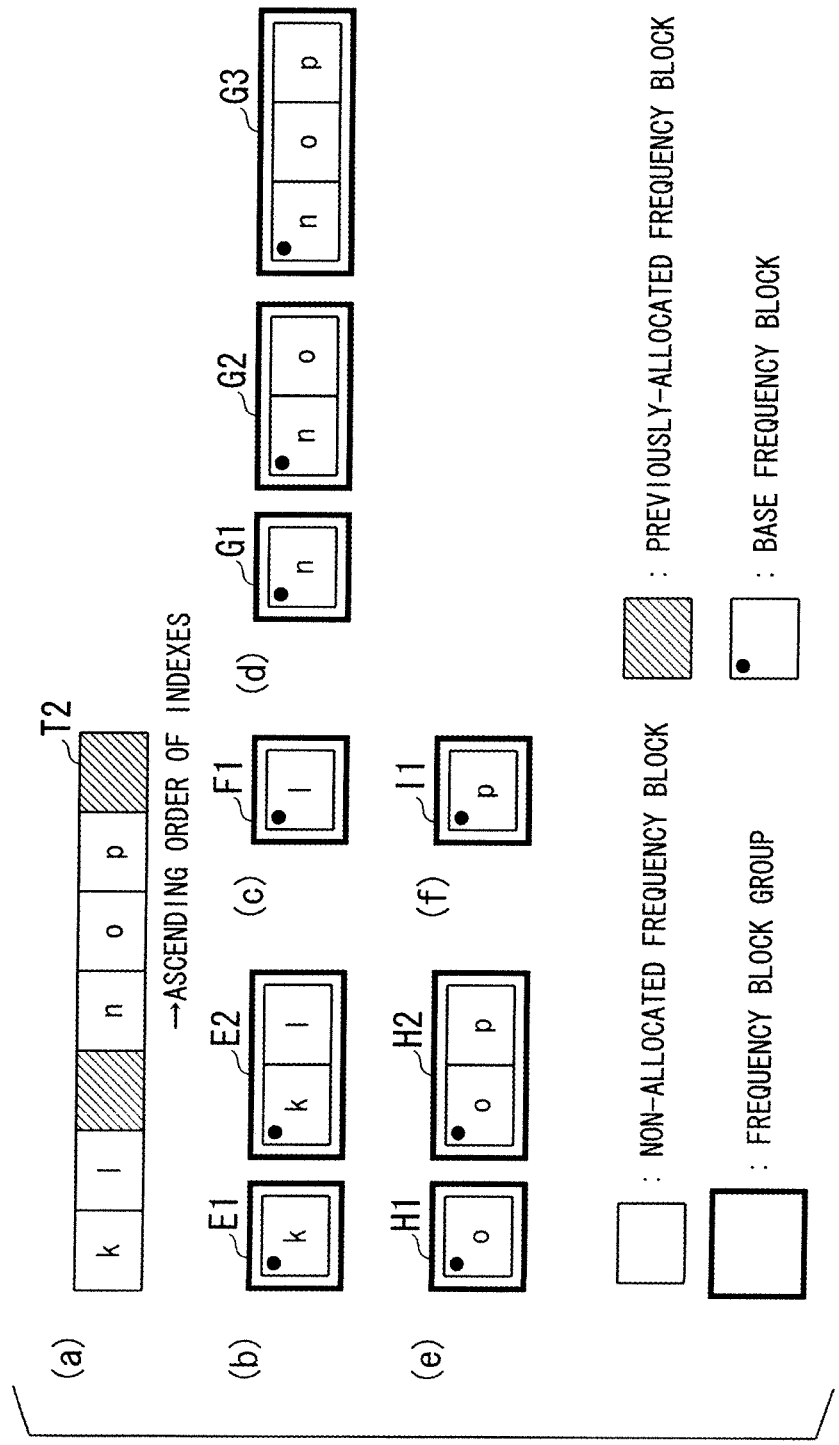
FIG. 9 is a diagram used for explaining the method of selecting the allocation index computation targets in Example 2.

FIG. 9 is a diagram used for explaining the method of selecting the allocation index computation targets in Example 2. For convenience of explanation, in the example of FIG. 9, there are 7 frequency blocks (having indexes k to q) in each sub-frame. Each frequency block group is selected from a non-allocated frequency block set T2 (see part (a) of FIG. 9) which consists of 5 non-allocated frequency blocks k, l, n, o, and p. The non-allocated frequency blocks k and l are continuous, the non-allocated frequency blocks l and n are discontinuous, and the non-allocated frequency blocks n, o, and p are continuous. The frequency blocks m and q are previously-allocated frequency blocks, and have been already secured for retransmission or the like.

In example 2, from an end of the system (frequency) band, the allocation index computation target selector 10 selects each non-allocated frequency block as a base point for the frequency block group selection. In the example of FIG. 9, the system band is defined from the frequency block k to the frequency block q. In the non-allocated frequency block set T2, the allocation index computation target selector 10 selects each of the non-allocated frequency blocks from "k" on one end of the system band to "q" on the other end in turn, to be a base point for the frequency block group selection. The allocation index computation target selector 10 then searches for one or more frequency block groups which start from each base point and whose frequency blocks are arranged in the ascending order of the indexes thereof.

In part (b) of FIG. 9, in the non-allocated frequency block set T2, the allocation index computation target selector 10 selects the non-allocated frequency block k on one end of the system band to be a base point (i.e., base frequency block) for the frequency block group selection. Then the allocation index computation target selector 10 searches the non-allocated frequency block set T2 for each frequency block group which consists of one or more non-allocated frequency blocks starting from the base frequency block k. As the result of the search, the allocation index computation target selector 10 selects a frequency block group E1 consisting of one non-allocated frequency block k, and a frequency block group E2 consisting of two continuous non-allocated frequency blocks k and l (see part (b) of FIG. 9).

In part (c), the allocation index computation target selector 10 selects the non-allocated frequency block l (next to the non-allocated frequency block k) to be a base frequency block. Then the allocation index computation target selector 10 searches the non-allocated frequency block set T2 for each frequency block group which consists of one or more non-allocated frequency blocks starting from the base frequency block l. As the result of the search, the allocation index computation target selector 10 selects a frequency block group F1 consisting of one non-allocated frequency block l (see part (c)).

In part (d), the allocation index computation target selector 10 selects the non-allocated frequency block n (next to the non-allocated frequency block l) to be a base frequency block. Then the allocation index computation target selector 10 searches the non-allocated frequency block set T2 for each frequency block group which consists of one or more non-allocated frequency blocks starting from the base frequency block n. As the result of the search, the allocation index computation target selector 10 selects a frequency block group G1 consisting of one non-allocated frequency block n, a frequency block group G2 consisting of two continuous non-allocated frequency blocks n and o, and a frequency block group G3 consisting of two continuous non-allocated frequency blocks n, o, and p (see part (d)).

In part (e), the allocation index computation target selector 10 selects the non-allocated frequency block o (next to the non-allocated frequency block n) to be a base frequency block. Then the allocation index computation target selector 10 searches the non-allocated frequency block set T2 for each frequency block group which consists of one or more non-allocated frequency blocks starting from the base frequency block o. As the result of the search, the allocation index computation target selector 10 selects a frequency block group H1 consisting of one non-allocated frequency block o, and a frequency block group H2 consisting of two continuous non-allocated frequency blocks o and p (see part (e)).

In part (f), the allocation index computation target selector 10 selects the non-allocated frequency block p (next to the non-allocated frequency block o) to be a base frequency block. Then the allocation index computation target selector 10 searches the non-allocated frequency block set T2 for each frequency block group which consists of one or more non-allocated frequency blocks starting from the base frequency block p. As the result of the search, the allocation index computation target selector 10 selects a frequency block group I1 consisting of one non-allocated frequency block p (see part (f)).

Example 3

Figure 6:
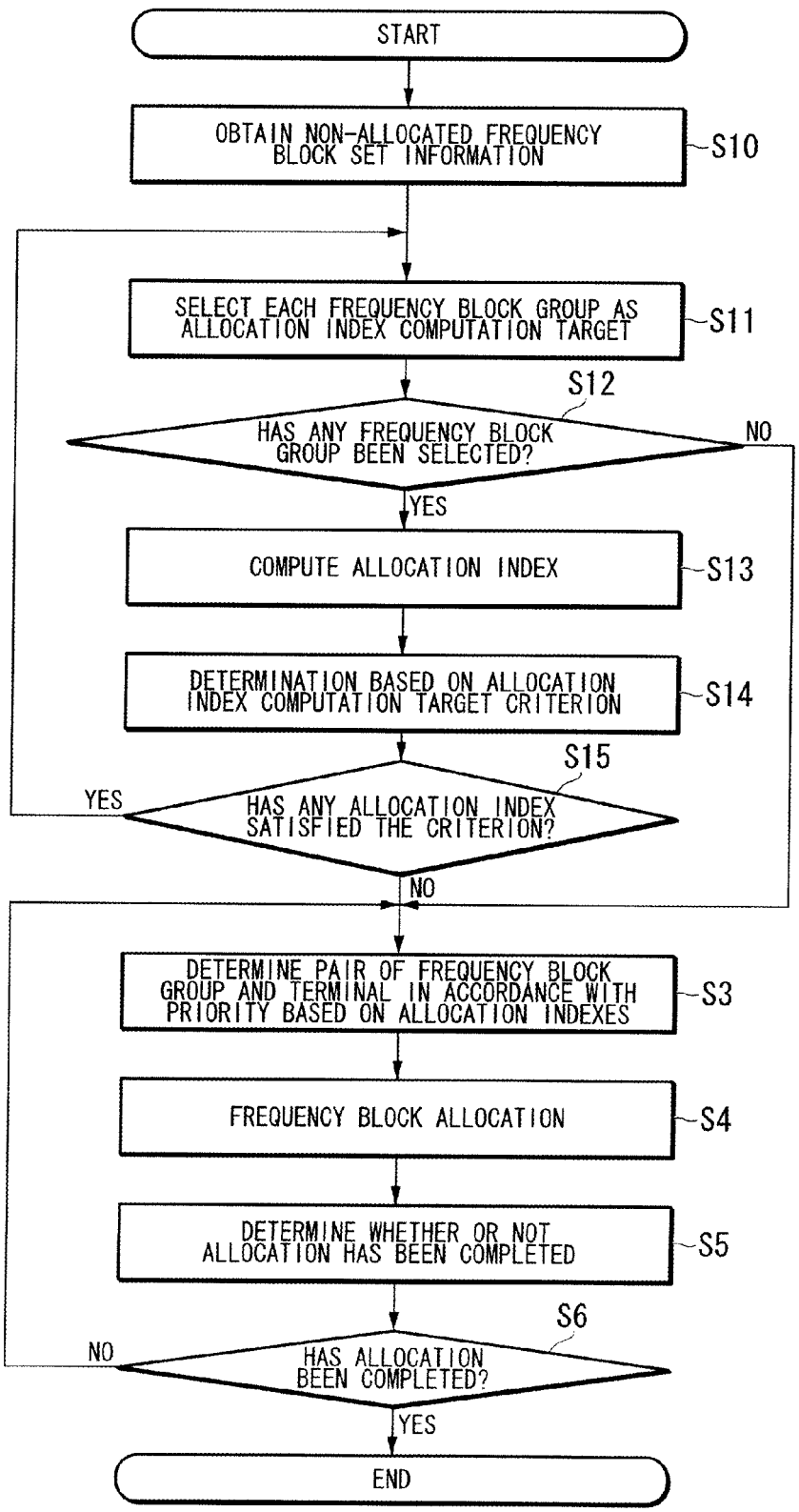
FIG. 6 is a flowchart showing a frequency block allocation method for Example 3 of the present invention.

FIG. 6 is a flowchart showing a frequency block allocation method in Example 3 of the present invention. Below, referring to FIG. 6, the operation of the wireless resource allocation unit 1 (see FIG. 4) in Example 3 will be explained together with appropriate practical examples.

The wireless resource allocation unit 1 starts the operation of FIG. 6 when the frequency block allocation timing of a sub-frame comes.

In step S10, the allocation index computation target selector 10 obtains non-allocated frequency block set information from the frequency block manager 40.

In the next step S11, based on the non-allocated frequency block set information, the allocation index computation target selector 10 selects each frequency block group from the non-allocated frequency block set. In this process, if a restriction is imposed on the number of the frequency blocks included in each frequency group, the allocation index computation target selector 10 performs the frequency block group selection based on the restriction.

Accordingly, when any frequency block group has been selected (i.e., "YES" in step S12), the allocation index computation target selector 10 informs the allocation index computation unit 20 of the allocation indexes of all non-allocated frequency blocks which form each frequency block group. The operation proceeds to step S13. If no frequency block group has been selected (i.e., "NO" in step S12), the operation proceeds to step S3.

In step S13, the allocation index computation unit 20 computes the allocation index assigned to the pair of each frequency block group and the relevant communication terminal 200. The communication terminal 200 informs the frequency block allocation unit 30 and the allocation index computation target selector 10 of each computed allocation index and information about the relevant pair of the computation targets (i.e., the indexes of all non-allocated frequency blocks which form the relevant frequency block group and an identifier of the relevant communication terminal 200).

In the next step S14, the allocation index computation target selector 10 determines whether or not each allocation index communicated from the allocation index computation unit 20 satisfies an allocation index computation target criterion. Accordingly, if there is any allocation index which satisfies the allocation index computation target criterion (i.e., "YES" in step S15), the operation returns to step S11. In this process, the allocation index computation target selector 10 stores information about each pair whose allocation index satisfies the allocation index computation target criterion, and determines only those pairs whose allocation index satisfies the allocation index computation target criterion to be targets of future allocation index computation. On the contrary, if there is no allocation index which satisfies the allocation index computation target criterion (i.e., "NO" in step S15), the operation proceeds to step S3.

Figure 10:
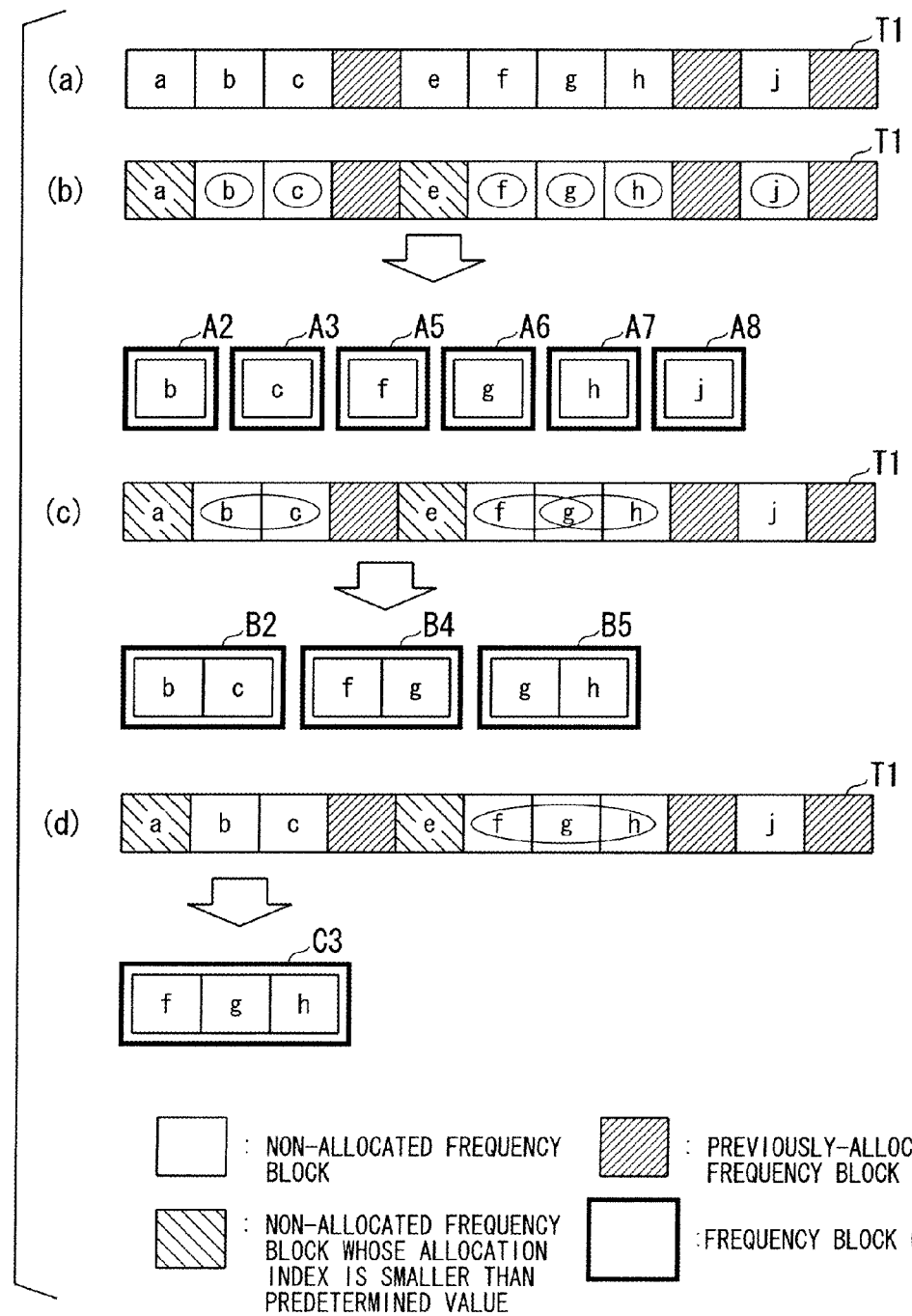
FIG. 10 is a diagram used for explaining the method of selecting the allocation index computation targets in Example 3.

Below, referring to FIG. 10, a specific frequency block group selection method in Example 3 will be explained. That is, FIG. 10 is a diagram used for explaining the method of selecting the allocation index computation targets in Example 3. For convenience of explanation, in the example of FIG. 10, there are 11 frequency blocks (having indexes a to k) in each sub-frame. Each frequency block group is selected from a non-allocated frequency block set T1 (see part (a) of FIG. 10) which consists of 8 non-allocated frequency blocks a, b, c, e, f, g, h, and j. The non-allocated frequency blocks a, b, and c are continuous. The non-allocated frequency blocks c and e are discontinuous. The non-allocated frequency blocks e, f, g, and h are continuous. The non-allocated frequency blocks h and j are discontinuous. In addition, frequency blocks d, i, and k are previously-allocated frequency blocks, and have already been secured for retransmission or the like.

In a selection example of part (b) in FIG. 10, based on the information "a, b, c, e, f, g, h, and j" of the non-allocated frequency block set T1, the allocation index computation target selector 10 selects all non-allocated frequency blocks a, b, c, e, f, g, h, and j as frequency block groups A1, A2, A3, A4, A5, A6, A7, and A8, respectively. Therefore, the frequency block groups A1, A2, A3, A4, A5, A6, A7, and A8 each consist of one non-allocated frequency block. The allocation index computation unit 20 computes the allocation index of each possible pair between all frequency block groups A1 to A8 and all communication terminals 200. The allocation index computation target selector 10 then determines whether or not the allocation index of each pair satisfies an allocation index computation target criterion.

In the example of FIG. 10, the allocation index computation target criterion is that the allocation index is greater than or equal to a predetermined value. Therefore, when the allocation index is greater than or equal to a predetermined value, the allocation index satisfies the allocation index computation target criterion. When the allocation index is smaller than the predetermined value, the allocation index does not satisfy the allocation index computation target criterion.

In the example of part (b) of FIG. 10, for a communication terminal 200, the pair including the frequency block group A1 (consisting of frequency block a) and the pair including the frequency block group A4 (consisting of frequency block e) each do not satisfy the allocation index computation target criterion, and the other pairs having the frequency block groups A2, A3, A5, A6, A7, and A8 each satisfy the allocation index computation target criterion. For the relevant communication terminal 200, the allocation index computation target selector 10 determines only the frequency block groups A2, A3, A5, A6, A7, and A8 which satisfy the allocation index computation target criterion to be the allocation index computation targets.

Another selection example of part (c) in FIG. 10 is based on the selection results of part (b). For a communication terminal 200, the allocation index computation target selector 10 determines only the frequency block groups A2, A3, A5, A6, A7, and A8 which satisfy the allocation index computation target criterion to be the allocation index computation targets. For the relevant communication terminal 200, the allocation index computation target selector 10 then sets only the frequency block groups A2, A3, A5, A6, A7, and A8 to be selection targets, and selects frequency pairs "b and c", "f and g", and "g and h", each having two continuous non-allocated frequency blocks, to be frequency block groups B2, B4, and B5. That is, for the communication terminal 200, the allocation index computation target selector 10 selects frequency block groups, each having two continuous non-allocated frequency blocks selected only from the frequency block groups A2, A3, A5, A6, A7, and A8 which satisfy the allocation index computation target criterion. For the pairs defined between the frequency block groups B2, B4, and B5 and the relevant communication terminal 200, the allocation index computation unit 20 computes the allocation indexes.

The allocation index computation target selector 10 then determines whether or not the allocation index of each pair satisfies the allocation index computation target criterion (i.e., the allocation index is greater than or equal to a predetermined value). In the example of part (c) of FIG. 10, all frequency block groups B2, B4, and B5 satisfy the allocation index computation target criterion. Therefore, for the relevant communication terminal 200, the allocation index computation target selector 10 determines only the frequency block groups B2, B4, and B5 which satisfy the allocation index computation target criterion to be the allocation index computation targets.

Another selection example of part (d) in FIG. 10 is based on the selection results of part (c). For a communication terminal 200, the allocation index computation target selector 10 determines only the frequency block groups B2, B4, and B5 which satisfy the allocation index computation target criterion to be the allocation index computation targets. For the relevant communication terminal 200, the allocation index computation target selector 10 then sets only the frequency block groups B2, B4, and B5 to be selection targets, and selects a frequency pair "f, g, and h" having three continuous non-allocated frequency blocks, to be a frequency block group C3. That is, for the communication terminal 200, the allocation index computation target selector 10 selects a frequency block group having three continuous non-allocated frequency blocks selected only from the frequency block groups B2, B4, and B5 which satisfy the allocation index. For the pair defined between the frequency block group C3 and the relevant communication terminal 200, the allocation index computation unit 20 computes the allocation index.

The allocation index computation target selector 10 then determines whether or not the allocation index of the pair satisfies the allocation index computation target criterion (i.e., the allocation index is greater than or equal to a predetermined value). In the example of part (d) of FIG. 10, the frequency block group C3 satisfies the allocation index computation target criterion. Therefore, for the relevant communication terminal 200, the allocation index computation target selector 10 determines only the frequency block group C3 which satisfies the allocation index computation target criterion to be the allocation index computation target.

Here, in the example of FIG. 10, there is no another frequency block group which includes the frequency block group C3, no another frequency block group is selected in step S11, so that the result of step S12 is "NO".

Although the allocation index computation target criterion is that the allocation index is greater than or equal to a predetermined value in the example of FIG. 10, the allocation index computation target criterion is not limited thereto. The allocation index computation target criterion may be that the allocation index is included in N higher-ranking allocation indexes, or that allocation index is not included in N lower-ranking allocation indexes.

Returning to FIG. 6, steps S3 to S6 are equal to those of Example 1 (see FIG. 5), and explanations thereof are omitted.

In accordance with Example 3, for a communication terminal, only when the computed allocation index of a first frequency block group consisting of N non-allocated frequency blocks (N is a positive integer) satisfies an allocation index computation target criterion, a second frequency block group which includes the first frequency block group is selected to be an allocation index computation target. Therefore, effective allocation index computation targets can be limited, thereby improving the efficiency of the allocation index computation.

Example 4

Figure 11:
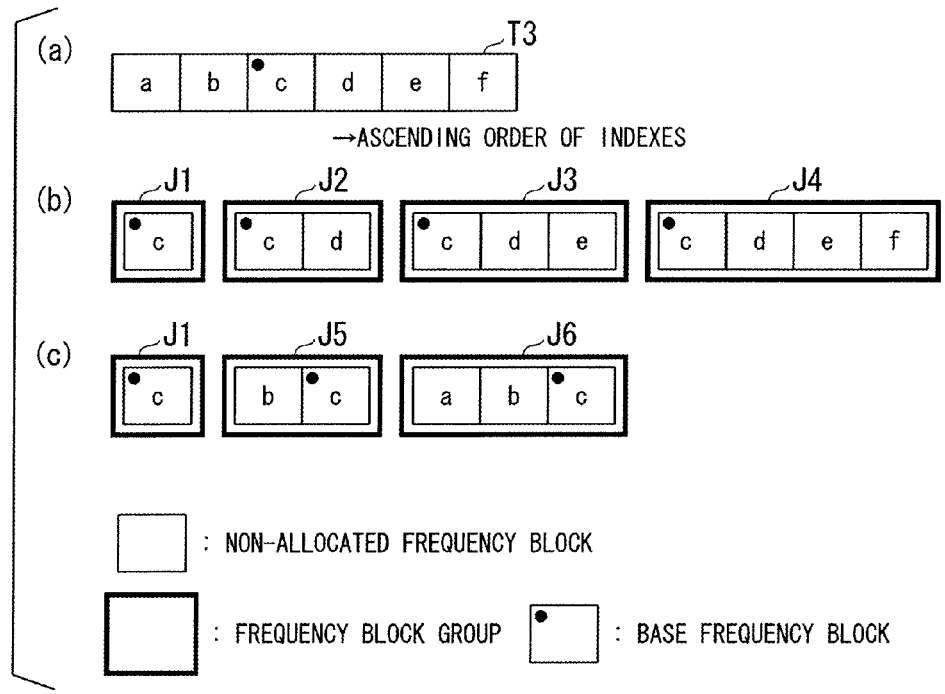
FIG. 11 is a diagram used for explaining the method of selecting the allocation index computation targets in Example 4.
Figure 12:
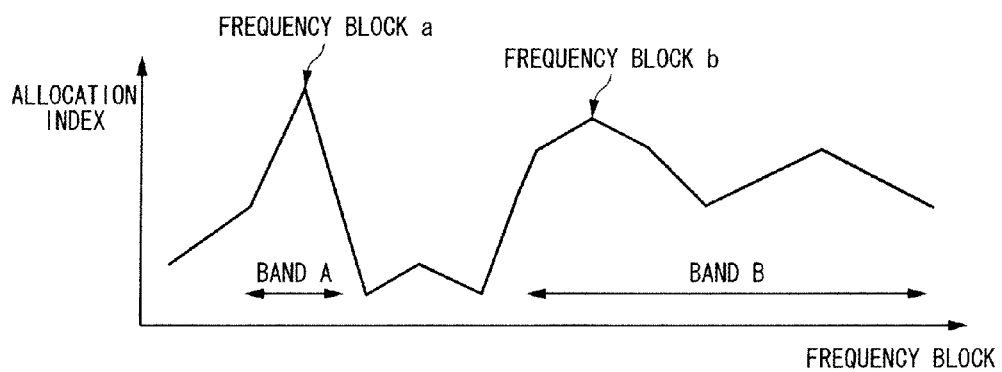
FIG. 12 is a graph used for explaining a problem in conventional methods.

FIG. 11 is a diagram used for explaining the method of selecting the allocation index computation targets in Example 4. For convenience of explanation, in the example of FIG. 11, there are 6 frequency blocks (having indexes a to f) in each sub-frame. Each frequency block group is selected from a non-allocated frequency block set T3 (see part (a) of FIG. 11) which consists of 6 non-allocated frequency blocks a, b, c, d, e, and f. All non-allocated frequency blocks a to f are continuous.

In Example 4, the allocation index computation target selector 10 searches for and selects each frequency block group which starts from a base point (i.e., a base frequency block) for the frequency block group selection and whose frequency blocks are arranged in the ascending or descending order of the indexes thereof. In the example of FIG. 11, the frequency block groups are searched for and selected, from the base frequency block c in the ascending order (c→d→e→f) or the descending order (c→b→a) of the indexes of the frequency blocks.

In the selection example shown in part (b) of FIG. 11, the allocation index computation target selector 10 searches for each frequency block group consisting of one or more continuous non-allocated frequency blocks which start from the base frequency block c and are arranged in the ascending order of the relevant indexes. As the search results, the allocation index computation target selector 10 selects a frequency block group J1 consisting of one non-allocated frequency block c, a frequency block group J2 consisting of two continuous non-allocated frequency blocks c and d, a frequency block group J3 consisting of three continuous non-allocated frequency blocks c, d, and e, a frequency block group J4 consisting of four continuous non-allocated frequency blocks c, d, e, and f (see part (b)).

In the selection example shown in part (c) of FIG. 11, the allocation index computation target selector 10 searches for each frequency block group consisting of one or more continuous non-allocated frequency blocks which start from the base frequency block c and are arranged in the descending order of the relevant indexes. As the search results, the allocation index computation target selector 10 selects a frequency block group J1 consisting of one non-allocated frequency block c, a frequency block group J5 consisting of two continuous non-allocated frequency blocks b and c, and a frequency block group J6 consisting of three continuous non-allocated frequency blocks a, b, and c, (see part (c)).

The allocation index computation target selector 10 may search for each frequency block group consisting of one or more continuous non-allocated frequency blocks which start from the base frequency block c and are arranged in the ascending and descending orders of the relevant indexes. In this case, in the example of FIG. 11, the allocation index computation target selector 10 selects a total of 6 frequency block groups J1 to J6 as shown in parts (b) and (c).

In addition, after the allocation index computation target selector 10 may search for each frequency block group consisting of one or more continuous non-allocated frequency blocks which start from the base frequency block c and are arranged in the ascending and descending orders, one of the selected frequency block groups, which corresponds to the ascending or descending order, may be selected.

For example, in case of the example of FIG. 11, the allocation index computation target selector 10 first selects the frequency block group J2 shown in part (b) and the frequency block group J5 shown in part (c). Then the allocation index computation unit 20 computes an allocation index assigned to the pair of the frequency block group J2 and the communication terminal 200, and an allocation index assigned to the pair of the frequency block group J5 and the communication terminal 200. For the communication terminal 200, the allocation index computation target selector 10 compares the allocation index for the frequency block group J2 with the allocation index for the frequency block group J5. As the result of the comparison, the allocation index computation target selector 10 selects one of the frequency block groups which has a better allocation index. If the allocation index for the frequency block group J2 is better than that for the frequency block group J5, the allocation index computation target selector 10 selects the frequency block group J2.

The allocation index computation target selector 10 sets the selected frequency block group to be a base frequency block group, and again searches for and selects one or more frequency block groups in the ascending and descending orders of the relevant indexes. Then, one of the selected frequency block groups, which corresponds to the ascending or descending order, is selected. For example, for the frequency block group J2 (consisting of the non-allocated frequency blocks c and d) as the base point, (i) the frequency block group J3 consisting of the non-allocated frequency blocks c, d, and e searched for in the ascending order, and (ii) a frequency block group consisting of the non-allocated frequency blocks b, c, and d searched for in the descending order, are selected, and one of the selected frequency block groups which has a better allocation index is selected.

Example 5

Example 5 is a variation of Example 4. In Example 5, the allocation index computation target selector 10 selects one or more frequency block groups, which stars from a base frequency block, in the ascending and descending orders of the relevant indexes. In this process, for each of the ascending and descending orders, the allocation index computation target selector 10 determines whether or not the frequency block group selection can be performed.

In the example of FIG. 11, for each of the selected example shown in part (b) (i.e., in the ascending order of the relevant indexes) and the selected example shown in part (c) (i.e., in the descending order), it is determined whether or not the frequency block group selection can be performed.

In the selection example shown in part (b) of FIG. 11 (i.e., in the ascending order), the allocation index computation target selector 10 searches for each frequency block group which starts from the base frequency block c and includes one or two continuous non-allocated frequency blocks arranged in the ascending order of the indexes thereof. As the search results, the frequency block group J1 consisting of one non-allocated frequency block c and the frequency block group J2 consisting of two continuous non-allocated frequency blocks c and d are selected (see part (b) of FIG. 11). The allocation index computation unit 20 then computes an allocation index assigned to the pair of the frequency block group J1 and the relevant communication terminal 200 and an allocation index assigned to the pair of the frequency block group J2 and the relevant communication terminal 200. For the communication terminal 200, the allocation index computation target selector 10 compares the allocation index for the frequency block group J1 with the allocation index for the frequency block group J2. As the result of the comparison, only when the allocation index for the frequency block group J2 is equal to or better than the allocation index for the frequency block group J1, the allocation index computation target selector 10 selects frequency block groups which includes the frequency block group J2. Accordingly, the allocation index computation target selector 10 selects the frequency block group J3 consisting of three continuous non-allocated frequency blocks c, d, and e, and the frequency block group J4 consisting of four continuous non-allocated frequency blocks c, d, e, and f. The allocation index computation unit 20 then computes an allocation index assigned to the pair of the frequency block group J3 and the communication terminal 200, and an allocation index assigned to the pair of the frequency block group J4 and the communication terminal 200.

In the selection example shown in part (c) of FIG. 11 (i.e., in the descending order), the allocation index computation target selector 10 searches for each frequency block group which starts from the base frequency block c and includes one or two continuous non-allocated frequency blocks arranged in the descending order of the indexes thereof. As the search results, the frequency block group J1 consisting of one non-allocated frequency block c and the frequency block group J5 consisting of two continuous non-allocated frequency blocks b and c are selected (see part (c) of FIG. 11). The allocation index computation unit 20 then computes an allocation index assigned to the pair of the frequency block group J1 and the relevant communication terminal 200 and an allocation index assigned to the pair of the frequency block group J5 and the relevant communication terminal 200. For the communication terminal 200, the allocation index computation target selector 10 compares the allocation index for the frequency block group J1 with the allocation index for the frequency block group J5. As the result of the comparison, only when the allocation index for the frequency block group J5 is equal to or better than the allocation index for the frequency block group J1, the allocation index computation target selector 10 selects frequency block groups which includes the frequency block group J5. Accordingly, the allocation index computation target selector 10 selects the frequency block group J6 consisting of three continuous non-allocated frequency blocks a, b, and c. The allocation index computation unit 20 then computes an allocation index assigned to the pair of the frequency block group J6 and the communication terminal 200.

If the number of the frequency blocks included in each frequency block group is restricted, the allocation index computation target selector 10 selects each frequency block group based on the relevant restriction. For example, if the number of the frequency blocks included in each frequency block group is limited to any one of 1, 2, and 4, the frequency block groups J3 and J6, whose number of the frequency blocks is 3, do not satisfy the relevant restriction. Therefore, in the selection example of part (b) of FIG. 11 (i.e., in the ascending order), the allocation index computation target selector 10 selects only the frequency block groups J1, J2, and J4. Similarly, in the selection example of part (c) (i.e., in the descending order), the allocation index computation target selector 10 selects only the frequency block groups J1 and J5.

In accordance with Example 5, for a communication terminal, an allocation index computation result assigned to a first frequency block group consisting of N non-allocated frequency blocks (N is a positive integer) is compared with an allocation index computation result assigned to a second frequency block group which consists of N+M non-allocated frequency blocks (M is a positive integer) and includes the first frequency block group. A third frequency block group which includes the second frequency block group is selected to be an allocation index computation target only when the allocation index computation result assigned to the second frequency block group is equal to or better than that assigned to the first frequency block group. Such a process of limiting effective allocation index computation targets is performed by effectively using a continuous variation in the frequency characteristics of each communication terminal Accordingly, it is possible to improve the efficiency of the allocation index computation. The above number M indicating the added non-allocated frequency blocks may be determined due to a restriction on the number of the frequency blocks in the relevant frequency block group.

Example 6

Example 6 is a variation of Example 5. In Example 5 explained above, in the selection example of part (b) of FIG. 11 (i.e., in the ascending order of the indexes), if the allocation index assigned to the pair of the frequency block group J2 and the communication terminal 200 is equal to or better than that assigned to the pair of the frequency block group J1 and the communication terminal 200, the allocation index computation target selector 10 selects both the frequency block groups J3 and J4 which each include the frequency block group J2.

In contrast, in Example 6, when the allocation index assigned to the pair including the frequency block group J2 is equal to or better than that assigned to the pair including the frequency block group J1, the allocation index computation target selector 10 selects only the frequency block group J3 formed by adding the non-allocated frequency block "e" to the frequency block group J2. The allocation index computation unit 20 then computes an allocation index of the pair of the frequency block group J3 and the relevant communication terminal 200. For the communication terminal 200, the allocation index computation target selector 10 then selects only the frequency block group J4, which is formed by adding the non-allocated frequency block "f" to the frequency block group J3, only when the allocation index computed for the frequency block group J3 is equal to or better than that computed for the frequency block group J2. The allocation index computation unit 20 then computes an allocation index assigned to the pair of the frequency block group J4 and the communication terminal 200. A similar operation is performed for the selection example of part (c) of FIG. 11 (i.e., in the descending order of the indexes).

Similar to the above-described Example 5, if the number of the frequency blocks included in each frequency block group is restricted, the allocation index computation target selector 10 selects each frequency block group based on the relevant restriction.

In accordance with Example 6, for a communication terminal, an allocation index computation result assigned to a first frequency block group consisting of N non-allocated frequency blocks (N is a positive integer) is compared with an allocation index computation result assigned to a second frequency block group which consists of N+M non-allocated frequency blocks (M is a positive integer) and includes the first frequency block group. A third frequency block group which includes the second frequency block group is selected to be an allocation index computation target only when the allocation index computation result assigned to the second frequency block group is equal to or better than that assigned to the first frequency block group. In this process, L continuous non-allocated frequency blocks (L is a positive integer) which follow the M non-allocated frequency blocks (added to the first frequency block group) are added to the second frequency block group, and only the third frequency block group consisting of such "N+M+L" non-allocated frequency blocks is selected to be an allocation index computation target.

Accordingly, it is possible to highly accurately limit the effective allocation index computation targets for a communication terminal by using a continuous variation in the frequency characteristics thereof. Therefore, the efficiency of the allocation index computation can be further improved. The above numbers M and L, which each indicate the added non-allocated frequency blocks, may be determined due to a restriction on the number of the frequency blocks in the relevant frequency block group. In addition, the number L is the minimum number for the relevant addition of the non-allocated frequency blocks.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, each frequency block may be formed by a single sub-carrier or a plurality of sub-carriers which are arranged continuously or at regular intervals. That is, a frequency block which conforms to the SC-FDMA method can be applied to the present invention.

A program for implementing the frequency block allocation process in Examples 1 to 6 may be stored in a computer-readable storage medium, and the stored program may be loaded on and executed by a computer system, so as to perform the frequency block allocation process. The computer system may include an operating system and hardware resources such as peripheral devices.

The computer-readable storage medium is a storage device which may be (i) a portable medium such as a flexible disk, a magneto-optical disk, a writable non-volatile memory (e.g., ROM or flash memory), or a DVD (digital versatile disk), or (ii) a hard disk installed in the computer system.

The computer-readable storage medium may be a memory which stores the program for a specific time, such as a volatile memory (e.g., a DRAM (dynamic random access memory)) in the computer system which functions as a server or client when the program is transmitted via a network (e.g., the Internet) or through a communication line (e.g., telephone line).

The above program may be transmitted from the computer system (which stores the program in a storage device or the like) via a transmission medium (on transmitted waves through the transmission medium) to another computer system. The transmission medium through which the program is transmitted is a network such as the Internet or a communication line such as a telephone line, that is, a medium which has a function of transmitting data.

In addition, a program for performing a portion of the above-explained processes may be used. Furthermore, a differential file (i.e., a differential program) to be combined with a program which has already been stored in the computer system may be provided to realize the above processes.

What is claimed is:

1. A frequency block allocation apparatus which is provided in a wireless base station, performs frequency block allocation using a single carrier frequency division multiple access method so that a terminal sends a wireless signal to the wireless base station, the apparatus comprising:
   a frequency block manager that stores allocation information which indicates whether or not each frequency block has been allocated to any terminal;
   an allocation index computation target selector that selects frequency block groups, each consisting of one or more non-allocated frequency blocks from a set of non-allocated frequency blocks, based on the allocation information, wherein the selected groups include those each consisting of continuous non-allocated frequency blocks, and do not include any that consists of non-continuous non-allocated frequency blocks;
   an allocation index computation unit that computes an allocation index for each target pair of each frequency block group and a terminal, based on channel quality information about the frequency block group with respect to the terminal; and
   a frequency block allocation unit that determines one of the target pairs to be a frequency block allocation target, in accordance with priority based on the computed allocation indexes.

2. The frequency block allocation apparatus in accordance with claim 1, wherein:
   for the terminal, if the computed allocation index assigned to a first frequency block group among the selected frequency block groups satisfies an allocation index computation target criterion, then the allocation index computation target selector selects a second frequency block group which is formed by continuously joining one non-allocated frequency block or continuous non-allocated frequency blocks to the first frequency block group.

3. The frequency block allocation apparatus in accordance with claim 2, wherein: the allocation index computation target selector compares the computed allocation index assigned to the first frequency block group with the computed allocation index assigned to the second frequency block group which includes the first frequency block group, and selects a third frequency block group, which is formed by continuously joining one non-allocated frequency block or continuous non-allocated frequency blocks to the second frequency block group, only when the computed allocation index of the second frequency block group is equal to or better than that of the first frequency block group.

4. The frequency block allocation apparatus in accordance with claim 3, wherein:
   the allocation index computation target selector selects only the third frequency block group to be an allocation index computation target for the terminal.

5. The frequency block allocation apparatus in accordance with claim 1, wherein:
   the allocation index computation target selector selects each non-allocated frequency block, in turn, starting from an end of a system band, to be a base point for the frequency block group selection.

6. The frequency block allocation apparatus in accordance with claim 1, wherein: the frequency blocks each consist of one sub-carrier or a plurality of sub-carriers which are arranged continuously or at regular intervals.

7. A frequency block allocation method which is used in a wireless base station, performs frequency block allocation using a single carrier frequency division multiple access method so that a terminal sends a wireless signal to the wireless base station, the allocation method comprising:
   a step that selects frequency block groups, each consisting of one or more non-allocated frequency blocks from a set of non-allocated frequency blocks, based on stored allocation information which indicates whether or not each frequency block has been allocated to any terminal, wherein the selected groups include those each consisting of continuous non-allocated frequency blocks, and do not include any that consists of non-continuous non-allocated frequency blocks;
   a step that computes an allocation index for each target pair of each frequency block group and a terminal, based on channel quality information about the frequency block group with respect to the terminal; and
   a step that determines one of the target pairs to be a frequency block allocation target, in accordance with priority based on the computed allocation indexes.

8. A computer program which is embedded on a non-transitory computer readable medium and used for making a computer execute a frequency block allocation operation in a wireless base station, where the operation uses a single carrier frequency division multiple access method so that a terminal sends a wireless signal to the wireless base station, and the program comprises:
   a step that selects frequency block group, each consisting of one or more non-allocated frequency blocks from a set of non-allocated frequency blocks, based on stored allocation information which indicates whether or not each frequency block has been allocated to any terminal, wherein the selected groups include those each consisting of continuous non-allocated frequency blocks, and do not include any that consists of non-continuous non-allocated frequency blocks;

a step that computes an allocation index for each target pair of each frequency block group and a terminal, based on channel quality information about the frequency block group with respect to the terminal; and a step that determines one of the target pairs to be a frequency block allocation target, in accordance with priority based on the computed allocation indexes.

\* \* \* \* \*